April 5, 1938.  W. G. WEHR  2,113,337
CRANE SCALE
Original Filed May 12, 1932   3 Sheets-Sheet 2

INVENTOR:
WILLIAM G. WEHR
Kwis Hudson & Kent
ATTORNEYS

INVENTOR:
WILLIAM G. WEHR
ATTORNEYS

Patented Apr. 5, 1938

2,113,337

UNITED STATES PATENT OFFICE 2,113,337

CRANE SCALE

William G. Wehr, Wickliffe, Ohio, assignor to The Cleveland Crane & Engineering Company, Wickliffe, Ohio, a corporation of Ohio Application May 12, 1932, Serial No. 610,887
Renewed September 3, 1937

11 Claims. (Cl. 212—2)

This invention relates to cranes preferably of the traveling type which are adapted to hoist and lower heavy loads of various types of material and an object of the present invention is to provide, as an integral part of the crane structure, an improved material weighing mechanism which is accurate, visible and readily readable from a distance and which will not easily get out of order.

Another object of the invention resides in providing a simplified structure rendering the same less expensive to manufacture, but at the same time maintaining the accuracy which is necessary to make a device of this character practicable.

Another object of the invention is to so support the loading platform and the weighing mechanism that the ordinary stresses set up in the trolley as it runs along the tracks, due to irregularities in the latter, will not be transmitted to the weighing mechanism to thereby effect its accuracy.

With the objects above indicated and other objects hereinafter explained in view, the invention consists in the construction and combination of elements hereinafter described and claimed.

Referring to the drawings:

Fig. 7 is a fragmentary sectional view taken on line 7—7 of Fig. 8 and showing in detail the construction of the flexible connection;

Fig. 8 is a fragmentary sectional view taken on line 8—8 of Fig. 7; and

Fig. 9 is a detailed view in elevation of the counterbalancing weight and indicating graduations of the weighing mechanism.

Figure 1:
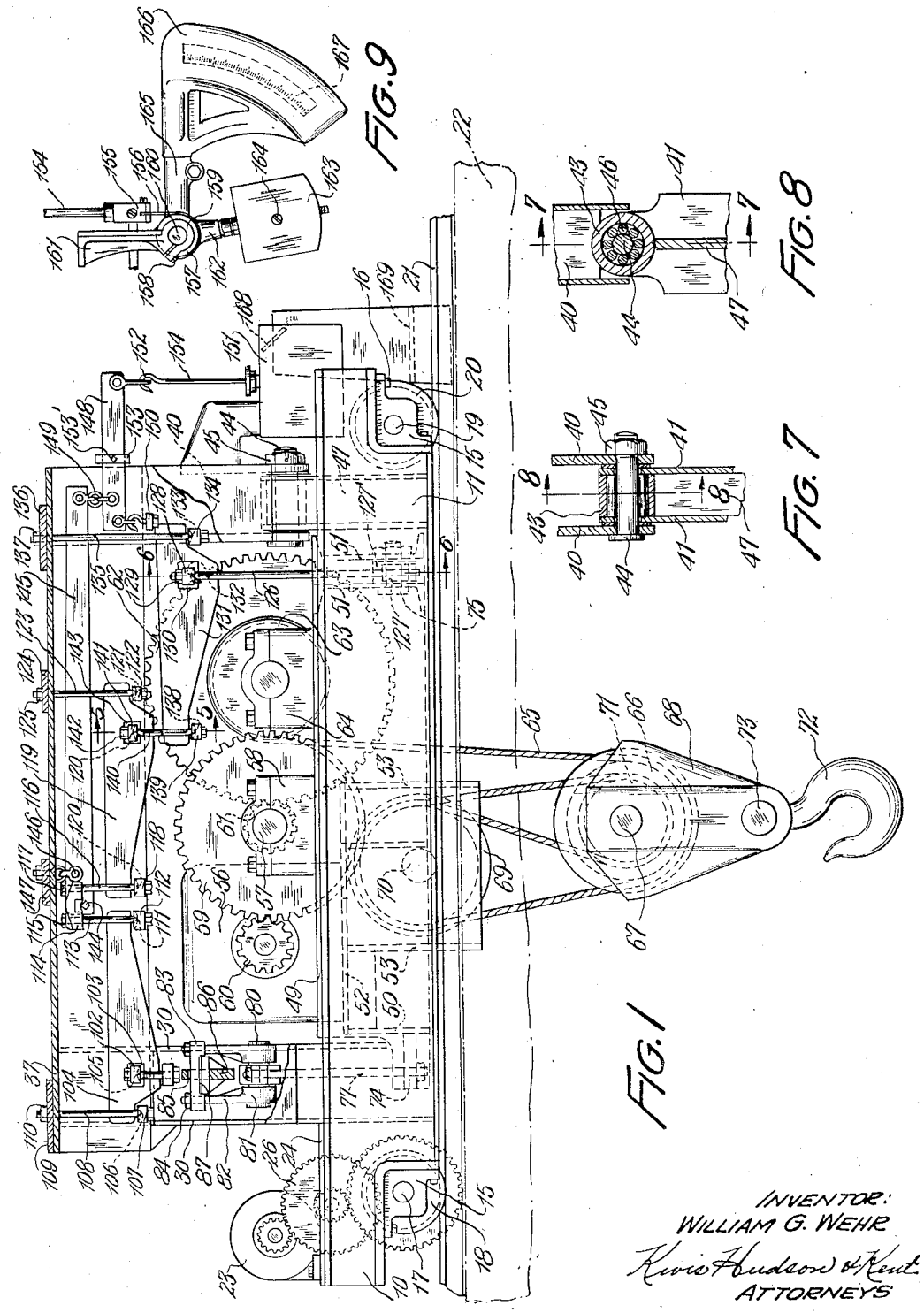
Figure 1 is a side elevational view of a crane trolley embodying the present invention, parts thereof being broken away to more clearly show the construction.

In the drawings I have illustrated the invention in conjunction with the trolley of a crane with which it is desirably associated for the purpose intended, but the ordinary parts of the crane structure, other than a portion of the bridge upon which the trolley is traversable, are not shown as it is believed that the construction and operation are well known to those versed in the art.

Figure 2:
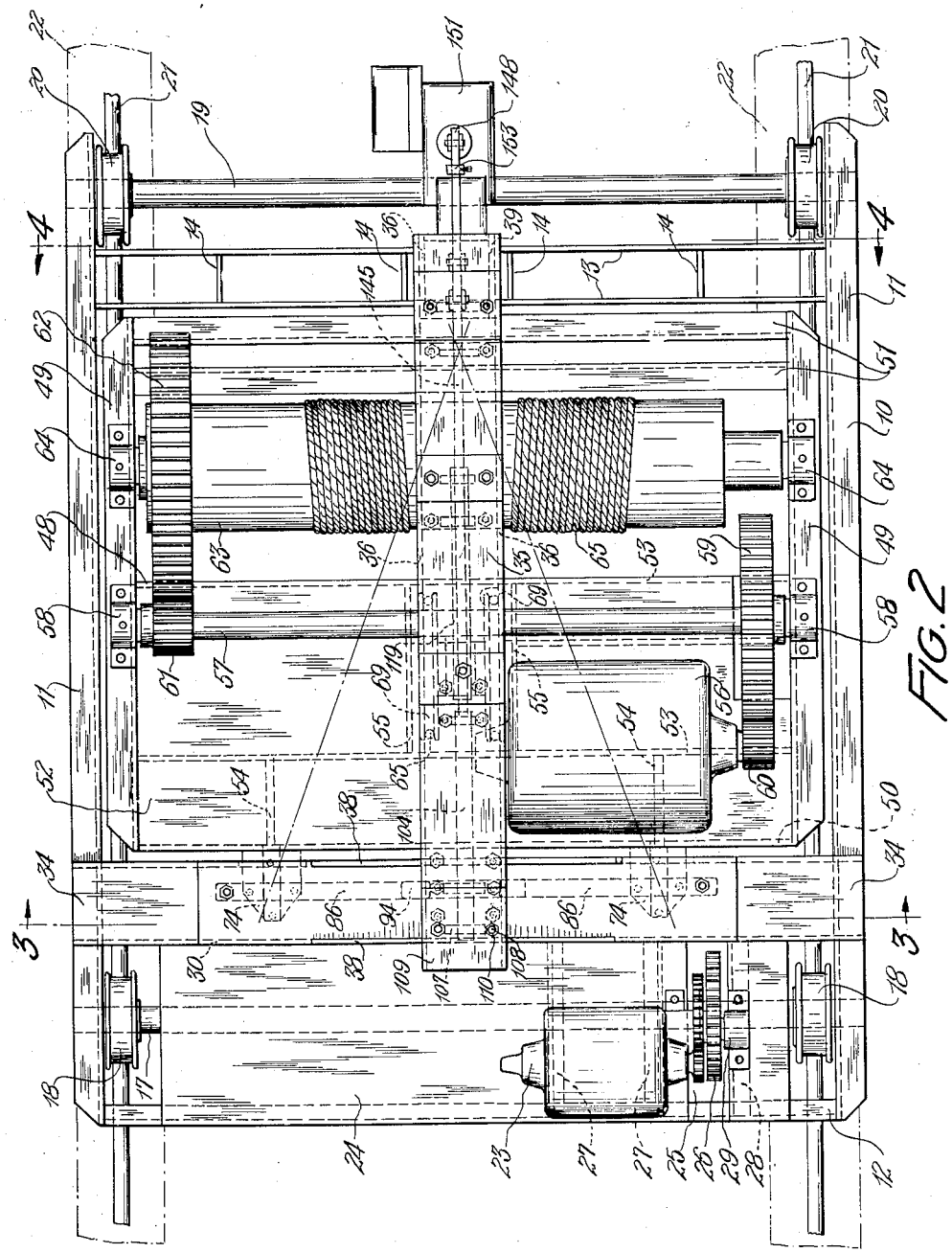
Fig. 2 is a top plan view of the crane trolley.

A trolley 10 comprises a pair of spaced longitudinally extending channel-shaped end frame members 11 maintained in assembled relation by a plurality of angle cross members 12 at one end, which are welded or otherwise secured to the ends of the end frame members 11 and at the opposite ends by transversely extending plates 13 which have their ends welded or otherwise secured to the opposite ends of the frame members 11, as clearly shown in Fig. 2. These plates 13 are spaced apart and reinforced by a plurality of diaphragms 14 which are welded or otherwise secured to the inner adjacent faces of the plates 13. The end frames 11 are cut away upon their under sides and at the opposite ends to provide seats for the usual bearing blocks 15, which are bolted at 16 or otherwise secured to the end frames 11. The bearing blocks 15 at one end of the trolley 10 rotatably support a shaft or axle 17 to the opposite ends of which are secured a pair of flanged wheels 18. The bearing blocks 15 at the opposite ends of the end frames 11 rotatably support a shaft or axle 19 to which are secured, at its opposite ends, a pair of flanged wheels 20, the flanged wheels 18 and 20 being in longitudinal alignment and engageable with a pair of spaced rails 21 mounted upon the transverse side members 22 of the bridge of a crane, not otherwise shown in detail.

One of the shafts or axles of the trolley 10, and preferably the axle 17, is driven so as to impart movement to the trolley along the rails 21 and, while this may be accomplished by any suitable means, I preferably provide a motor 23 which is mounted upon a plate 24 extending between the end frames 11 and welded or otherwise secured to the top of the angle member 12. This plate 24 terminates short at its opposite ends with respect to the end frames 11, so as to permit clearance for the flanged wheels 18. A portion of this plate is cut away at 25 to provide clearance for a gear reduction 26 interposed between the armature of the motor 23 and the axle 17, so as to positively drive the latter to thereby move the trolley along the rails 21. Any suitable gear reduction may be employed, depending upon the speed at which it is desired to move the trolley along the rails. Angle members 27 extend beneath the plate 24 and are welded or otherwise secured thereto, as well as to the angle member 12 and are suitably positioned to reinforce the plate at the location where the motor 27 is mounted. A similar angle 28 extends beneath the portion of the plate beyond the opening 25 and is secured in a like manner and reinforces the plate at this location for the purpose of supporting a bearing 29 within which is journaled the stub shaft of one of the gears of the gear reduction 26. Current for the motor may be supplied from any suitable source, such as the usual collectors mounted upon the bridge of the crane, and which are not herein illustrated as the means of supplying this current is well known in this art.

Figure 3:
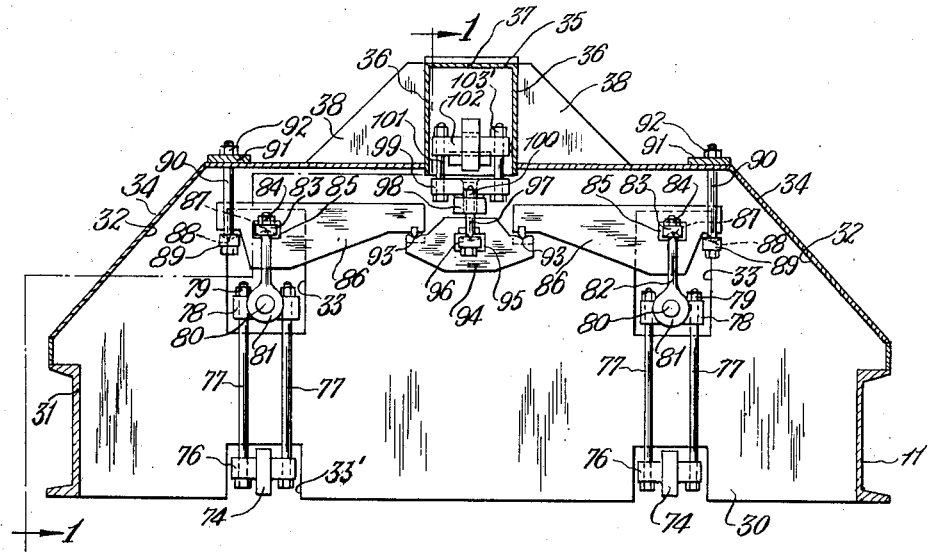
Fig. 3 is a transverse vertical sectional view taken on line 3—3 of Fig. 2 and showing the manner in which one end of the load supporting platform is suspended from the weighing mechanism.
Figure 5:
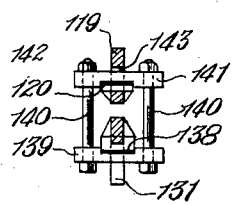
Fig. 5 is a fragmentary sectional view taken on line 5—5 of Fig. 1 and showing one of the knife-edge supports.

Preferably adjacent the drive end of the trolley 10 there are a pair of transversely extending plates 30 which are disposed in spaced relation longitudinally of the frame 10 and at their opposite ends are supported upon the end frames 11, the ends of the plates being cut away at 31 to fit the upper flange and inner surface of the web of the end frames 11, as shown in Fig. 3. The contacting surfaces of the plates 30 and the end frames 11 are welded or otherwise secured to each other, the plates extending a substantial distance above the upper flange of the end frames 11 and the corners thereof being severed angularly as at 32. The outer plate 30 is continuous and has the adjacent edge of the plate 24 welded thereto, but the inner plate 30 has upper openings 33 and lower openings 33' provided therein for clearance purposes, as will be later more specifically described. To maintain these plates 30 in spaced relation and provide a rigid structure and reinforcing means for the end frames 11, top plates 34 are formed to fit the contour of the plates above the end frames 11, as clearly shown in Fig. 3, and are welded or otherwise secured along the contacting surfaces of the plates 30, the inner adjacent ends of the top plates 34, however, being spaced apart.

Figure 4:
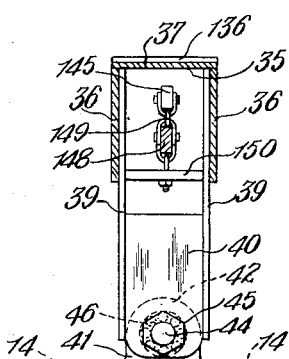
Fig. 4 is a transverse vertical sectional view taken on line 4—4 of Fig. 2 and showing the flexible connection between the weighing mechanism and the trolley frame.

A longitudinally extending inverted channel-shaped member 35 is disposed centrally of the end frames 11 and comprises a pair of spaced side plates 36 and a top plate 37 which are welded or otherwise secured to provide a rigid structure. The lower ends of the side plates 36 extend downwardly, as shown in Fig. 3, and abut with the inner adjacent ends of the plates 34 to which they are welded or otherwise secured and to rigidly reinforce this channel-shaped member 35, adjacent the plates 30, web plates 38 are provided directly above the plates 30 and are welded or otherwise secured to the side plates 36 and to the top plates 34. At the opposite end of the trolley 10 the channel-shaped member 35 terminates slightly beyond the tie plates 13 of the trolley 10 and, as this channel-shaped member 35 extends substantially parallel with the end frames 11, suitable means are provided for connecting this end of the channel-shaped member 35 with the tie plates 13. As there is considerable stress set up in the trolley 10 during its travel back and forth upon the rails 21, due to irregularities in the latter, and as it is undesirable to transmit this stress to the inverted channel-shaped member 35, for reasons which will be later described, a flexible connection therebetween is preferably employed, the details of which are more clearly shown in Fig. 4. A pair of vertically extending plates 39 are spaced apart and have their upper ends in engagement with the inner surfaces of the side plates 36 of the inverted channel-shaped member 35 and are welded or otherwise secured thereto, while the lower ends extend downwardly to a point adjacent the upper edges of the tie plates 13. Transversely extending bearing plates 40 are welded or otherwise secured to the lower ends of the plates 39 and which bearing plates 40 are spaced apart longitudinally, as shown in Fig. 1. The lower ends of the bearing plates 40 extend below the ends of the plates 39 and are slightly rounded to provide clearance between the lower ends of the bearing plates and the upper surfaces of the tie plates 13. A pair of plates 41, more clearly shown in Fig. 8, are welded between the inner pair of diaphragms 14 and have their upper ends extending above the upper surfaces of the tie plates 13 and rounded as at 42, these upper ends being spaced apart longitudinally and held in spaced relation by a sleeve 43. Aligned openings are provided in the plates 40 and 41 and receive therein a bolt 44 which is maintained in place by a nut 45. Roller bearings 46 are provided between the inner surface of the sleeve 43 and the bolt 44 to provide an anti-friction connection which prevents the stresses set up in the trolley 10 from being transmitted to the inverted channel-shaped member 35. To prevent rotation of the sleeve 43 a web plate 47 may be provided which is welded to the inner surface of the plates 41 and to the under surface of the sleeve 43.

A load supporting platform 48 is adapted to be mounted upon the trolley 10 in any suitable manner which will permit vertical movement thereof independently of the trolley 10 and is disposed between the transverse plates 30 and the transverse tie plates 13.

The platform 48 preferably consists of longitudinally extending channel-shaped side members 49 maintained in parallel spaced relation by a transversely extending cross member 50 at one end and a pair of channel shaped members 51 at the opposite end, the latter being spaced apart longitudinally with their webs adjacent to each other and the said cross members 50 and 51 being welded to the side members 49. The frame of the platform 48 is positioned in substantially the same horizontal plane as the frame of the trolley 10 with the side members 49 positioned adjacent the end frames 11, as clearly shown in Fig. 2. A cover plate 52 extends transversely between the side members 49 and has its opposite edges welded thereto, while one side of the plate 52 terminates above the cross member 50 and is welded thereto the opposite edge terminates adjacent the midportion of the side members 49. This plate 52 is disposed slightly below the upper surfaces of the side members 49 and is reinforced by transversely extending members 53, which have their opposite ends welded to the side members 49 and their upper surfaces with the under surface of the plate 52. Longitudinally extending diaphragms 54 are also provided to reinforce the structure and are welded respectively with the transverse cross members 50 and 53 and the under surface of the plate 52, while other reinforcing diaphragms 55 extend between the transverse members 53 and are welded thereto as well as to the underside of the plate 52.

A motor 56 is mounted upon the plate 52 on one side of the inverted channel-shaped member 35 and is adapted to be connected to any suitable source of current through the usual collectors which are not herein shown, as this manner of supplying current to devices of this type is well known in the art. A shaft 57 extends transversely of the platform 48 and has its opposite ends rotatably mounted in bearings 58 which are secured to the side members 49. At one end this shaft 57 has secured thereto an external gear 59 of any desirable pitch diameter, which meshes with a pinion 60 mounted upon the armature of the motor. At the opposite end of the shaft 57 a pinion 61 is secured thereto and meshes with an external gear 62 of any suitable pitch diameter, which is secured upon one end of a drum 63, likewise extending transversely of the platform 48 and disposed between the inner cross member 51 and the inner edge of the plate 52.

The trunnions of the drum 63 are rotatably supported in bearings 64 secured upon the side members 49. The drum 63 is of the grooved type and has a cable 65 mounted thereon, the ends of the cables 65 extending downwardly and passing around a pair of sheaves 66 rotatably supported by a pin 67, the ends of which are mounted within a block 68. The ends of the cables 65 extend upwardly from the block and pass around a pair of sheaves 69 which are rotatably mounted upon a pin 70, the ends of which are secured within the diaphragms 55. The cables then pass downwardly around sheaves 71 rotatably mounted on the pin 67 of the block 68 and then upwardly to a point adjacent the sheaves 69 and the ends are then secured in any suitable manner upon the under side of the frame 48. The block 68 has a hook 72 swively connected at 73 and which is adapted to support the desired load of material.

It is desirable to suspend the platform 48 upon the weighing mechanism from three points arranged triangularly to thereby prevent uneven movement of the platform during the weighing operation. In the preferred arrangement one end of the platform 48, and preferably the end adjacent the plates 30, have extensions 74 welded adjacent the lower portion of the cross member 50 and positioned adjacent the side members 49 by means of which the platform is suspended, while the opposite end is suspended from a bolt 75 which passes through aligned openings in the webs of the channel-shaped cross members 51, more clearly shown in Fig. 6, and which is located midway between the extensions 74. This platform is suspended from any suitable weight indicating mechanism, but in the drawings I have illustrated a preferred arrangement thereof. The extensions 74 have laterally extending integral lugs 76 having vertically extending openings therein through which extend a pair of hanger rods 77, the heads of the rods being adapted to engage the under side of the lugs 76. The upper ends of the hanger rods extend through openings in cross bars 78 and are secured therein by means of nuts 79, although the connection therebetween permits longitudinal adjustment of the hanger rods. The cross bars 78 have transverse openings which receive pins 80, the outer ends of which are supported in aligned openings provided in the enlarged heads 81 of hanger rods 82.

The upper ends of the hanger rods 82 extend though openings in cross bars 83 and, while being adjustable therethrough, are maintained in position by nuts 84. The cross bars 83 extend through openings 85 provided in arms 86 which extend transversely of the trolley 10 and have their inner adjacent ends spaced apart, as shown in Fig. 3. The cross bars 83 are supported upon knife edges 87 and the outer ends of the arms 86 are likewise supported upon knife edges 88, which include cross bars 89 having vertically extending openings through which hanger rods 90 extend, the heads of the hanger rods engaging the under surfaces of the cross bars 89, while the upper ends of the hanger rods 90 extend through aligned openings in the plate 34 and bearing plates 91 and are maintained in position by means of nuts 92 rendering the connection adjustable. The inner ends of the arms 86 are supported upon knife edges 93 provided upon the under sides thereof and in the upper sides of an equalizer 94. The equalizer 94 has a transverse opening 95 through which extends a cross bar 96 and which has vertically extending openings through which extend hanger rods 97, the heads thereof engaging the under side of the cross bar, while the upper ends extend through openings in laterally extending lugs 98 formed integral with a cross bar 99.

Nuts 100 maintain the hanger rods 97 in proper position, but at the same time permit longitudinal adjustment. The cross bar 99 also has vertically extending openings adjacent its outer ends through which hanger rods 101 extend, the heads thereof engaging the under surface of the cross bar 99, while the upper ends extend through openings in a cross member 102 and are maintained in position by nuts 103' providing adjustability therefor. The cross member 102 extends through a transverse opening 103 provided in an arm 104 and is mounted for free movement upon a knife edge 105. One end of the arm 104 is supported upon a knife edge 106 formed between the arm 104 and a cross bar 107, the latter being provided with vertically extending openings at its opposite ends to receive hanger rods 108, the heads thereof engaging the under side of the cross bar 106, while the upper ends extend through aligned openings in the plate 37 and a bearing plate 109. Nuts 110 maintain the hanger rods in position and at the same time provide adjustability thereof. The forward end of the arm 104 is likewise supported upon a knife edge 111 formed between the under side of the arm 104 and a cross bar 112. The cross bar 112 has vertically extending openings adjacent its outer ends to receive therein hanger rods 113, the heads thereof engaging the under side of the cross bar 112, while the upper ends extend through aligned openings in one side of an equalizer 114. Nuts 115 are provided to maintain the hanger rods in proper position and permit adjustability. The opposite sides of the equalizer 114 also have vertically extending openings through which extend hanger bars 116 maintained in proper position by nuts 117. The lower ends of the hanger rods extend through openings in the opposite ends of a cross car 118 and the heads on the rods engage the under side thereof.

An arm 119 has its inner end supported upon a knife edge 120 provided between the end of the arm and the cross member 118, while the opposite end of the arm is supported upon a knife edge 121 provided between the under side of the arm and a cross bar 122. The cross bar 122 has openings adjacent its ends through which extends hanger rods 123, the heads thereon being engageable with the under side of the cross bar 122, while the upper ends extend through aligned openings in the plate 37 and the bearing plate 124. Nuts 125 are provided to maintain the hanger rods in proper position and to provide for adjustment.

Figure 6:
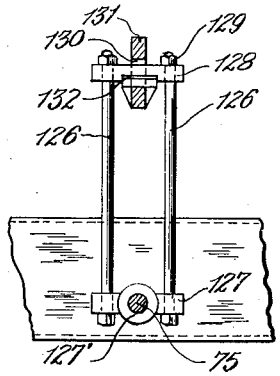
Fig. 6 is a fragmentary sectional view taken on line 6—6 of Fig. 1 and showing the manner in which the other end of the load supporting platform is supported from the weighing mechanism.

The opposite side of the platform 48 is supported by means of the pin 75, as already explained, from a pair of hanger rods 126, the lower ends of which extend through openings provided in laterally extending lugs 127 formed upon a collar 127', the latter having an opening through which the pin 75 extends, better shown in Fig. 6. The upper ends of the hanger rods 126 extend through openings in a cross bar 128 and nuts 129 are provided to maintain the hanger rods in proper position and to permit adjustability. The cross bar 128 extends through an opening 130 provided in an arm 131 and is supported upon a knife edge 132 formed between the arm and the cross bar. One end of the arm 131 is supported upon a knife edge 133 formed between the under side of the arm and a cross bar 134 which has openings provided in its opposite ends to receive hanger rods 135, the heads engaging the under side of the cross bar, while the opposite ends extend through aligned openings in the plate 37 and a bearing plate 136. Nuts 137 are provided to maintain the hanger rods in proper position and to permit adjustability. The opposite end of the arm 131 is also mounted upon a knife edge 138 provided between the under side of the arm and a cross bar 139 which has openings adjacent its opposite ends to receive hanger rods 140, the heads engaging the under side of the cross bar 139, while the upper ends extend through openings provided in the ends of a cross bar 141. Nuts 142 are provided to maintain the hanger rods in proper position and to permit for adjustment. The cross bar 141 extends through an opening 143 provided in the arm 119 and is mounted upon a knife edge 120 provided between the under side of the cross bar and the lower portion of the opening.

The equalizer 114 is mounted upon a knife edge 144 carried at the end of an arm 145 which is pivotally supported adjacent thereto at 146 by a flexible connection secured to the top plate 37 and a bearing plate 147. The opposite end of the arm 145 extends forwardly from approximately the midportion of the trolley to adjacent one end thereof and is connected with an arm 148 by means of a flexible connection 149. One end of the arm 148 is pivotally connected to a cross member 150 having its ends secured to the plates 39, while the opposite end is connected to the weighing mechanism 151 by means of a hook 152. A weight 153 is slidably adjustable upon the arm 148 and is secured in adjusted position by means of a lock screw 153'.

A rod 154, which has the hook 152 formed at its upper end, extends downwardly within the housing of the weighing mechanism 151 and is connected, as more clearly shown in Fig. 9, with a clamp 155 which in turn has secured thereto one end of a tape 156, which extends around a circular disc 157 to which the opposite end is secured by means of a screw 158. The disc is preferably an integral part of a hub 159 which is rotatably mounted upon a pin 160, the ends of which are secured within a bracket 161 bolted or otherwise secured to one of the plates 49. The hub 159 has a depending arm 162 upon which is slidably mounted a weight 163 which may be secured in adjusted position by a set screw 164. The hub 159 further has a laterally extending arm 165 upon which is secured a segment 166 having graduations 167 representing preferably pounds or tons, as the case may require. The graduations in this segment are reflected by means of a reflector 168 which is suitably positioned within the housing 151 and are transmitted through a magnifying glass 169 which enables an operator standing upon the ground at a remote distance to visibly and quickly ascertain the weight of the load suspended from the hook 72. The weight 163 and the segment 166 are moved in unison by actuation of the rod 154 which causes the tape 156 to rotate the hub 159 upon which the circular disc 157 is mounted.

It is of considerable importance, in producing an accurate weighing mechanism of this character, that the trolley frame be rigidly reinforced at one end, which applicant has accomplished by providing the transverse plates 30 and the cover plate 34 and by welding these members together and to the end frames 11. It is further desirable, therefore, to mount the drive motor 23 for the control upon this reinforced end, because of the additional rigidity afforded, although it is not essential that the trolley be driven at this point.

It is, however, important that the movable platform 48 be suspended from three points arranged in triangular relation, as indicated by the dotted lines in Fig. 2, so that an accurate weighing of the load will be accomplished irrespective of the location from which it is supported. It is furthermore important that the platform 48 be suspended from two points at one end adjacent the opposite corners and that these points of suspension be adjacent the reinforced end of the trolley frame or next to the plates 30, as shown therein. This will result in preventing any twisting movement of the trolley frame, during its travel along the rails, being imparted to the movable platform 48 adjacent the supports and will, therefore, not cause any twisting movement at this end of the platform.

The forward end of the trolley does not need to be so rigidly reinforced, for the reason that deflections in the bridge which supports the rails occur, due to the application of various loads and starting and stopping of the trolley, as well as the bridge. As it is desirable that the wheels 18 and 20 should contact with these rails a certain amount of twisting occurs at the end of the trolley adjacent the wheels 20. Again it is important that this twisting movement is not transmitted to the weighing mechanism or to the platform 48 upon which the load is supported and consequently the flexible or pivotal connection through the bolt 44 is provided to prevent this from happening, as any twisting movement will be compensated for through this flexible connection and will not be imparted to the overhead member 35. The opposite end of the platform 48, therefore, is pivotally supported from a point adjacent its central portion and, being suspended from the weighing mechanism, which is mounted upon the overhead member 35, twisting movement of the trolley frame is prevented from being transmitted to the platform 48.

In the operation of the device the load to be weighed is suspended from the hook 72 which in turn is suspended from the hoisting mechanism mounted solely upon the vertically movable platform 48. This platform 48, being suspended from the lever arms or balancing mechanism in the present instance, multiplies the movement of the platform 48 and therethrough causes the weight 163 to be rotated about the pivot 160 in amount proportionate to the load which is supported by the hook 72. Movement of the weight 163 also causes the segment 166 to be moved which indicates the weight of the load and is readily readable by means of the magnifying glass 169. It should be understood that the weight of the load can be readily seen by an operator upon the ground below the trolley and in many instances this distance is in excess of 100 feet, so that the desirability of being able to determine the weight of the load by the operator will be readily recognized by those skilled in the art.

While I have described the preferred embodiment of my invention, it is to be understood that I am not to be limited thereto inasmuch as changes and modifications may be resorted to without departing from the spirit of the invention as defined in the appended claims.

Having thus described my invention, I claim:

1. In an overhead traveling crane, the combination of a movable trolley, a hoist frame, hoist mechanism carried by said hoist frame, three levers pivotally supported in said trolley, means for operatively connecting three spaced points of said hoist frame to said levers whereby said hoist frame is wholly supported thereby, means for yieldably resisting the movement of said levers about their pivots, and means for indicating the extent of said movement.

2. In an overhead traveling crane, the combination of a movable trolley, a hoist frame, hoist mechanism carried by said hoist frame, a member, means for pivotally supporting one end of said member in said trolley, means for rigidly supporting the other end of said member in said trolley, and means comprising weighing mechanism for supporting said hoist frame from said member.

3. In an overhead traveling crane, the combination of a movable trolley comprising a trolley frame, a member disposed above said trolley frame, one end of said member being rigidly connected to said trolley frame and the opposite end being pivotally connected to said trolley frame, a hoist frame, hoist mechanism carried by said hoist frame, means for movably suspending said hoist frame from said member, means for yieldably resisting the movement of said hoist frame, and means for indicating the movement of said hoist frame.

4. A trolley comprising a frame, front and rear wheels mounted on said frame, a member extending longitudinally of and disposed above in substantial parallelism with respect to said frame, one end of said member being rigidly secured to said frame and the other end being flexibly connected to said frame, a load supporting member disposed beneath said member, means for suspending said load supporting member from said member for movement independently of said frame, means for yieldably resisting the movement of said member, and means for indicating the movement of said load supporting member.

5. A trolley comprising a frame, front and rear wheels mounted on said frame, a member extending longitudinally of and disposed above in substantial parallelism with respect to said frame, one end of said member being rigidly secured to said frame and the other end being flexibly connected to said frame, a load supporting member disposed beneath said member, means for suspending said load supporting member at three points in triangular arrangement for movement independently of said frame, means for yieldably resisting the movement of said member, and means for indicating the movement of said load supporting member.

6. A trolley comprising a frame having spaced side members and cross members connected thereto, a longitudinally extending member disposed above said frame, one end of said member being rigidly connected to said frame and the opposite end being flexibly connected to said frame, a platform disposed between the side members of said frame, means for movably suspending said platform from said member, means for yieldably resisting the movement of said platform, and means for indicating the movement of said platform.

7. A trolley comprising a frame having spaced side members and cross members connected thereto, a longitudinally extending member disposed above said frame, one end of said member being rigidly connected to said frame and the opposite end being flexibly connected to said frame, a platform disposed between the said members of said frame, hoist means mounted on said platform, means for movably suspending said platform from said member, means for yieldably resisting the movement of said platform, and means for indicating the movement of said platform.

8. A trolley comprising a frame having spaced side members and cross members connected thereto, a longitudinally extending member disposed above said frame, one end of said member being rigidly connected to said frame and the opposite end being flexibly connected to said frame, a platform disposed between the side members of said frame, motor operated hoist means mounted on said platform, means for movably suspending said platform from said member, means for yieldably resisting the movement of said platform, and means for indicating the movement of said platform.

9. A trolley comprising a frame having spaced side members and cross members connected thereto, a longitudinally extending member disposed above said frame, one end of said member being rigidly connected to said frame and the opposite end being flexibly connected to said frame, a platform disposed between the side members of said frame, load supporting means including a motor operated drum mounted solely on said platform, means for movably suspending said platform from said member, means for yieldably resisting the movement of said platform, and means for indicating the movement of said platform.

10. A trolley comprising a frame having spaced side members and cross members connected thereto, a longitudinally extending member disposed above said frame, one end of said member being rigidly connected to said frame and the opposite end being flexibly connected to said frame, a platform disposed between the side members of said frame, means for movably suspending said platform from said member, said platform being suspended at one side from adjacent opposite corners thereof and at the other side from adjacent the center thereof, means for yieldably resisting the movement of said platform, and means for indicating the movement of said platform.

11. A crane comprising a bridge, a trolley traversable along said bridge, motor operated means on said trolley for impelling the latter along said bridge, a longitudinally extending member disposed above the trolley frame, said member being rigidly connected at one side to said trolley and at the opposite end flexibly connected thereto, a platform movably suspended from said member, means for yieldably resisting the movement of said platform, motor operated hoist means mounted on said platform and adapted to support a load, and means for indicating the movement of said platform and visibly readable from a distance.

WILLIAM G. WEHR.